May 20, 1924.

T. J. McCLUSKEY

BEARING

Filed Feb. 20, 1923    2 Sheets-Sheet 1

1,494,695

Witnesses
Charles H. Buckler
George A. Gruss

Inventor
Thomas J. McCluskey
By Joshua R. H. Potts
His Attorney

May 20, 1924.

T. J. McCLUSKEY

BEARING

Filed Feb. 20, 1923  2 Sheets-Sheet 2

1,494,695

Witnesses
Charles H. Buckler
George A. Gruss

Inventor
Thomas J. McCluskey
By Joshua R. H. Potts
His Attorney

Patented May 20, 1924.

1,494,695

UNITED STATES PATENT OFFICE.

THOMAS J. McCLUSKEY, OF GLOUCESTER, NEW JERSEY.

BEARING.

Application filed February 20, 1923. Serial No. 620,185.

*To all whom it may concern:*

Be it known that I, THOMAS J. MCCLUSKEY, a citizen of the United States, residing at Gloucester, in the county of Camden and State of New Jersey, have invented certain new and useful Improvements in Bearings, of which the following is a specification.

My invention relates to bearings, more particularly to roller bearings and has for its objects to provide a roller bearing which will reduce friction to a minimum, have comparatively few parts and which is easily assembled.

Figure 1:
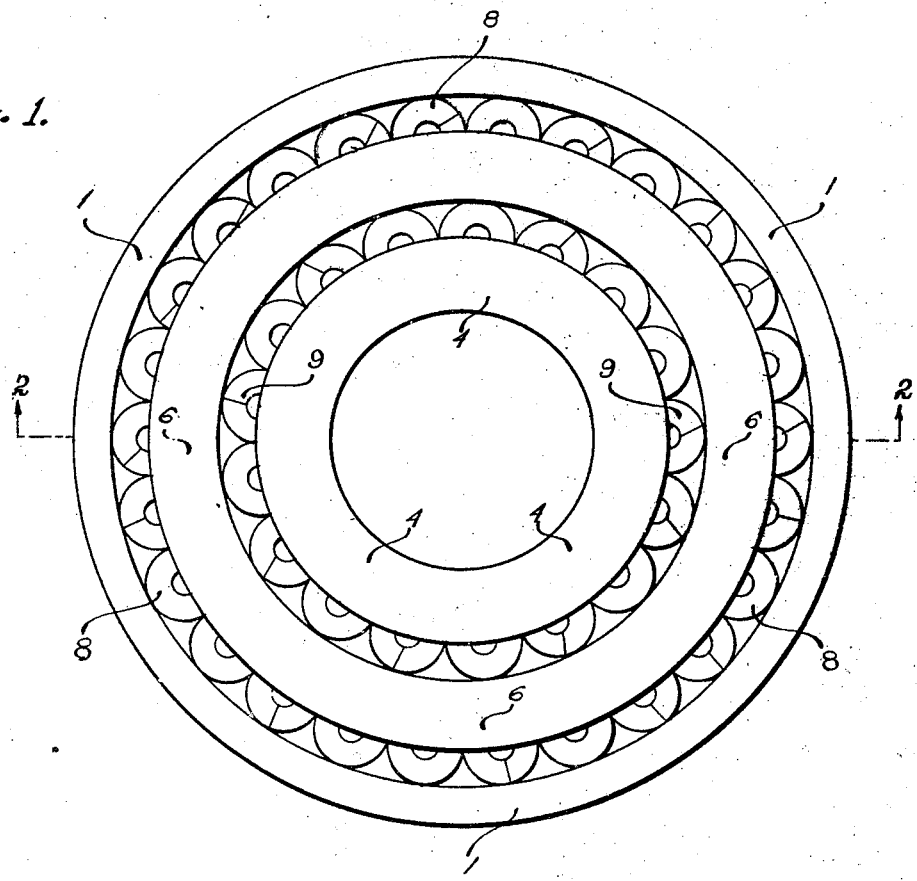
Figure 2:
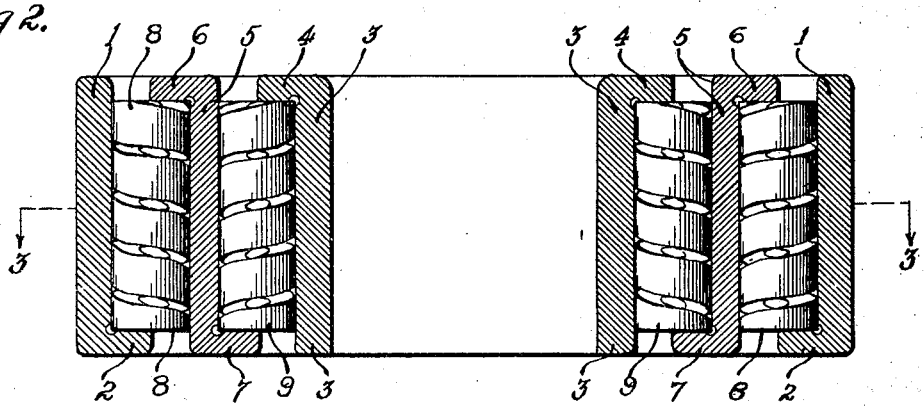
Figure 3:
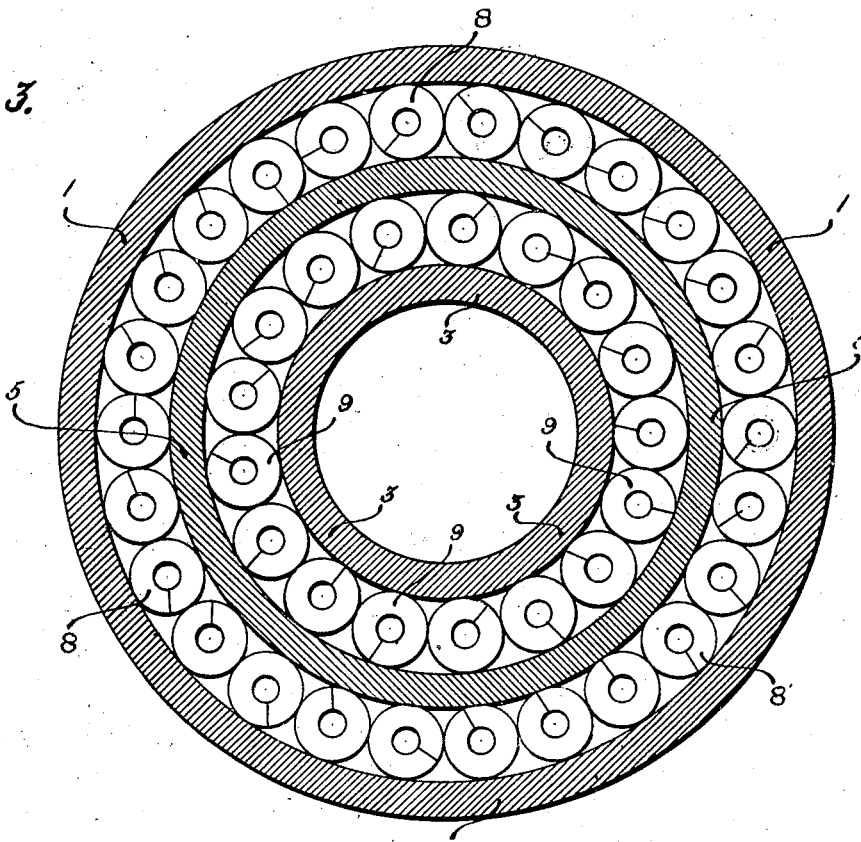
Figure 4:
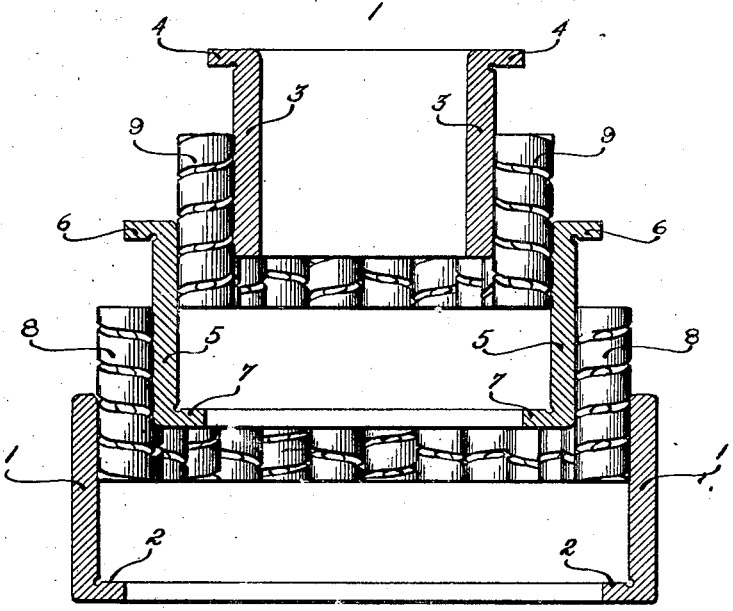

These objects, and other advantageous ends which will be described hereinafter, I attain in the following manner, reference being had to the accompanying drawings in which Figure 1 is a plan view of a bearing constructed in accordance with my invention, Figure 2 a section on line 2—2 of Figure 1, Figure 3 a section on line 3—3 of Figure 2, and Figure 4 a view similar to Figure 2 drawn on a smaller scale illustrating the parts partly separated.

Referring to the drawings, my roller bearing includes an outer ring 1 having an inwardly extending flange 2 and an inner ring 3 having an outwardly extending flange 4. An intermediate ring 5 has an outwardly extending flange 6 on one end and an inwardly extending flange 7 on the other end. A set of rollers 8 is placed between the intermediate and outer ring and a set of rollers 9 between the intermediate and inner ring.

To place my bearing in use a shaft or other rotating part is fitted in the inner ring and the outer ring is fixed to a bearing support. A set of rollers 8 is then placed around the inside of the outer ring and the intermediate ring positioned within the set of rollers 8 so that flange 6 will barely abut the ends of the rollers. A set of rollers 9 is then placed within the intermediate ring, and the shaft with the inner ring thereon is placed in position within the set so that flange 4 will barely abut the ends of the rollers. The bearing parts are thus held in operative position, the outer ring being fixed to a bearing support prevents lengthwise displacement of the parts in one direction and the inner ring being fixed to the shaft prevents lengthwise displacement of the parts in the other direction. The flanges on the rings prevent lengthwise displacement of the rollers. The bearing is then ready for use.

When my bearing is in use friction is reduced to a minimum for the reason that binding of the rollers is not likely to occur in the two sets at the same time. The bearing is of especial value when a shaft rotates in one direction and a wheel rotatably mounted on the shaft rotates in the opposite direction, rollers 4 reducing friction of the shaft and rollers 8 reducng friction of the wheel.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A roller bearing including an outer ring having an inwardly extending flange; an inner ring having an outwardly extending flange; an intermediate ring having an outwardly extending flange on one end and an inwardly extending flange on the other end, and rollers between the rings and the flanges.

2. A roller bearing including an outer ring; an inner ring; an intermediate ring; rollers between the rings; flanges on the inner and outer ring adapted to abut one end of the rollers, and flanges on the intermediate ring adapted to abut the other end of the rollers.

In testimony whereof I have signed my name to this specification in the presence of two subscribing witnesses.

THOMAS J. McCLUSKEY.

Witnesses:
  CHAS. E. POTTS,
  ELIZABETH GARBE.